United States Patent [19]
Hanson

[11] 3,897,690
[45] Aug. 5, 1975

[54] MINIATURE INERTIAL GRADE HIGH SHOCK AND VIBRATION CAPABILITY ACCELEROMETER AND METHOD WITH AXIS ALIGNMENT AND STABILITY FEATURES

[75] Inventor: Richard A. Hanson, Concord, Calif.

[73] Assignee: Systron Donner Corporation, Concord, Calif.

[22] Filed: Jan. 15, 1973

[21] Appl. No.: 323,783

[52] U.S. Cl. .................. 73/517 B; 308/DIG. 10
[51] Int. Cl. ........................................... G01p 15/08
[58] Field of Search...... 73/514, 515, 516 R, 517 R, 73/517 B, 496, 71.1, 71.3; 308/DIG. 10, 26

[56] References Cited
UNITED STATES PATENTS

| | | | |
|---|---|---|---|
| 2,455,532 | 12/1948 | Sunstein | 73/71.3 UX |
| 3,167,965 | 2/1965 | Peterson | 73/492 |
| 3,246,525 | 4/1966 | Clark | 73/517 B |
| 3,295,378 | 1/1967 | Hirtreiter | 73/517 B |
| 3,494,204 | 2/1970 | Whitehead | 73/517 B |
| 3,545,282 | 12/1970 | Kennedy et al. | 73/514 |
| 3,603,159 | 9/1971 | Morrow | 73/517 R |
| 3,709,030 | 1/1973 | Aselman | 73/71.1 |

Primary Examiner—James J. Gill
Attorney, Agent, or Firm—Flehr, Hohbach, Test, Albritton & Herbert

[57] ABSTRACT

An accelerometer contained in a sealed case with a total volume of one cubic inch containing a seismic mass on a moving system having pivots supported by a support base within the case. A pair of spring support members are disposed between the support base and the moving system containing the seismic mass. The spring support members are in the form of split leaf spring supports having a viscoelastic material between the leaf springs with a pivot bearing in each member. The viscoelastic material performs a damping function for the spring-mass system represented by the moving system supported on the leaf springs. Mechanical stops are provided surrounding the moving system at positions which limit motion of the moving system structure when subjected to shock and vibration for relieving forces exerted by the moving system pivots on the pivot bearings.

17 Claims, 5 Drawing Figures

PATENTED AUG 5 1975 3,897,690

SHEET 4

MINIATURE INERTIAL GRADE HIGH SHOCK AND VIBRATION CAPABILITY ACCELEROMETER AND METHOD WITH AXIS ALIGNMENT AND STABILITY FEATURES

BACKGROUND OF THE INVENTION

This invention relates to accelerometers for use in inertial grade applications where small size and weight are re-required and the capability of operation in severe environments is also necessary. Such accelerometers are useful where compact size is required due to space limitations and where operating or survival environments threaten to degrade instrumention performance. Moreover the accelerometer is relatively less complex than accelerometers with commensurate environmental and accuracy characteristics.

Accelerometer control system components are oftentimes required to function without degradation of performance in severe environmental circumstances. High vibration and shock levels are not uncommon during certain phases of aircraft, space, and earthborne control system operations. Acceleration sensors for use in such systems are generally complex and consequently expensive, oftentimes requiring a volume for mounting which is inconvenient. It is apparent that an accelerometer characterized by simpler construction, less cost, lighter weight, and smaller volume which is capable of withstanding severe environmental conditions is needed.

SUMMARY AND OBJECTS OF THE INVENTION

The present invention disclosures an accelerometer which is sealed from the surrounding atmospheric environment and contains a support base which supports a moving system having a pendulous mass. The moving system has pivots which may rotate in pivot bearings. The pivot bearings are contained in a pair of spring support members attached to the support base. A viscoelastic material is an integral part of the spring support members. A pickoff is disposed between the moving system and the support base for providing an output responsive to the movement of the seismic mass about the pivot axis. Torquing means responsive to the pickoff output signal is installed to maintain the moving system in a substantially neutral position relative to the support base. The spring support members serve to maintain a preload on the pivot bearings and yet prevent resonance of the moving system on the spring support by providing damping in the viscoelastic material. Shock stops are located in the support base surrounding the moving system so that motion experienced by the moving system when the shock stops are contacted is limited to provide for attenuation of forces occurring between the bearings and the pivots for the moving system.

It is an object of the present invention to provide an accelerometer of the above character which is capable of continuing to function without degradation in high stock and vibration environments.

It is another object of the invention to provide an accelerometer of the above character which is small in volume and light in weight.

It is another object of the invention to provide an accelerometer of the above character which gives inertial grade performance with simple construction.

It is another object of the present invention to provide an accelerometer of the above character with component parts arranged in such a manner as to provide the most efficient use of the available space and the optimum operating conditions for the pickoff and the torquer.

It is another object of the present invention to provide an accelerometer of the above character which utilizes optical pickoff means and provides a gain factor through implementation of an optical lever principle.

It is another object of the present invention to provide an accelerometer of the above character with reduced axis alignment sensitivity to temperature variation.

Additional objects and features of the invention will appear from the following description in which the preferred embodiments are set forth in detail in conjunction with the accompanying drawings.

DESCRIPTION OF THE PREFERRED EMBODIMENTS

Figure 1:
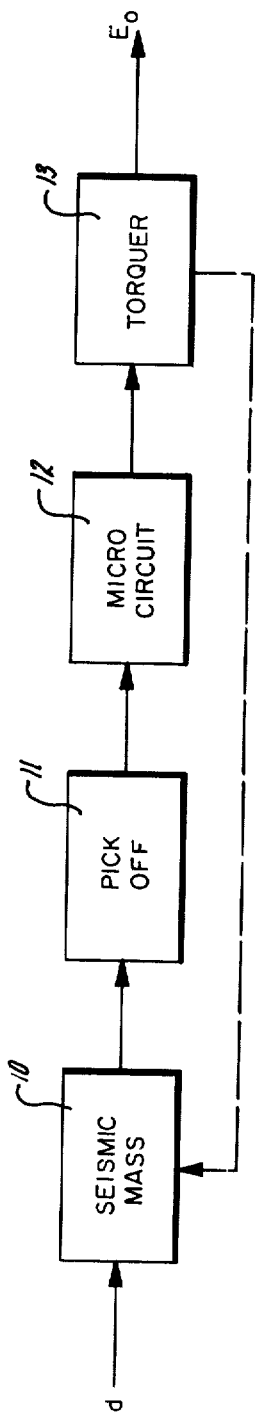
FIG. 1 is a block diagram of the accelerometer.

The accelerometer disclosed herein is of the force-balance type. It contains a moving system responsive to external acceleration stimuli which is held in a substantially neutral position relative to the frame by internally generated torques derived from an output signal produced by a pickoff in response to the motion of the moving system. Referring to FIG. 1 an inertial element or seismic mass 10 experiences a displacement "$d$" due to an external acceleration stimulus. A pickoff 11 responsive to the displacement of the seismic mass 10 produces an output signal which is connected to circuit 12. Circuit 12 produces an electric current in a conventional manner which is connected to torquer 13 for providing a torque tending to cancel displacement $d$. The current generating the restoring torque from the torquer 13 is a measure of the input acceleration stimulus.

Figure 2:
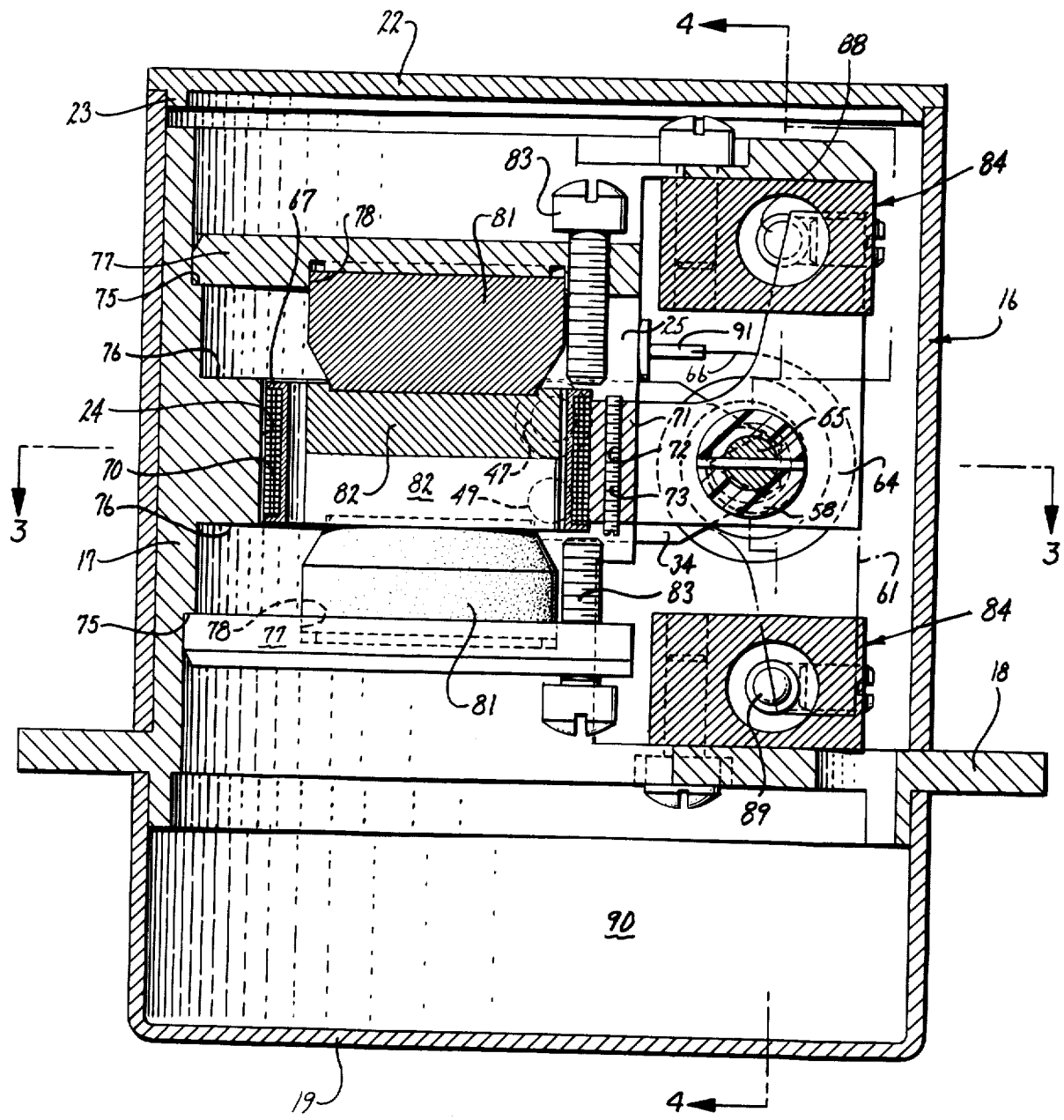
FIG. 2 is a sectional side elevation view of the accelerometer.

FIG. 2 is a sectional view displaying the interior of the accelerometer and showing an outer case 16 which in this embodiment encloses a total volume of approximately 1 cubic inch.

A frame or support base 17 is formed to fit into the inside diameter of case 16 and a flange 18 formed on support base 17 extends outward of the diameter of case 16 abutting one end of case 16. Flange 18 provides a mounting surface in this embodiment. The outer case seal is effected by placing a shallow cover 19 so that it encloses one end of support base 17 and abuts flange 18 on the side opposite that abutting case 16. The remaining open end of case 16 is enclosed by a flat cover 22 which has an annular land 23 formed to fit within the inside diameter of case 16.

Support base 17 has a generally cylindrical portion which is concentric with flange 18. Support base 17 also has a bore 24 extending through, parallel to the axis of the cylindrical portion and offset therefrom. Another portion of the support base 17 overlying the cylindrical axis is cut away to provide lateral access to the bore 24 through a channel 25 as seen in FIG. 3.

Figure 3:
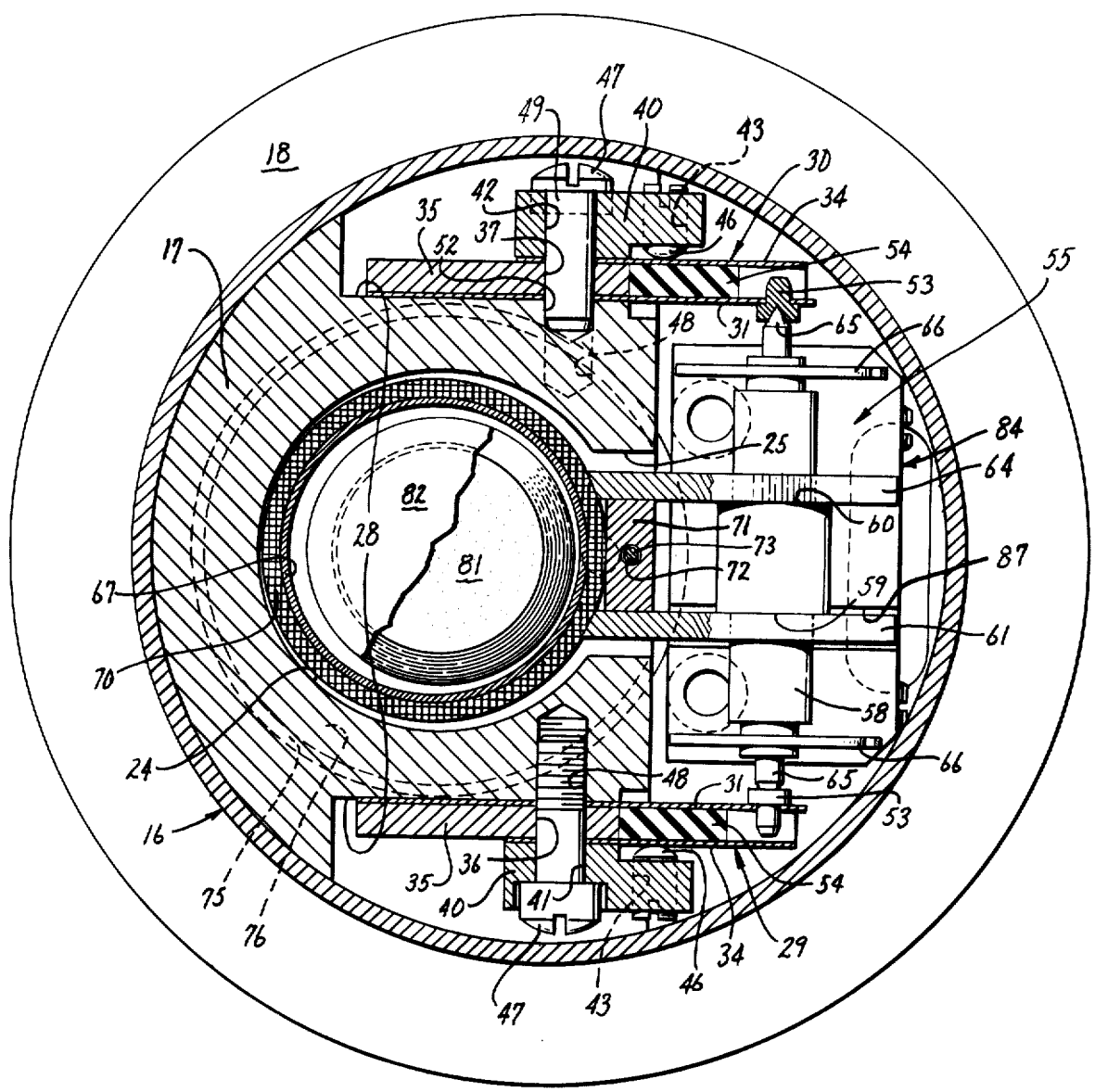
FIG. 3 is a sectional plan view along line 3—3 in FIG. 2.

As best seen in FIG. 3 support base 17 has a planar area 28 formed on each side. Spring support members 29 and 30 are mounted on the planar areas 28 on each side of support base 17. Spring support members 29 and 30 contain an inner or primary leaf spring 31 and an outer preload leaf spring 34. Primary and preload leaf spring 31 and 34 have first and second through clearance holes (not shown) and are secured on opposite sides of a locating and adjustment block 35 which also has first and second clearance holes 36 and 37 aligned with the first and second clearance holes in the leaf spring 31 and 34. A preload block 40 has first and second clearance holes 41 and 42 aligned with the clearance holes 36 and 37 respectively in locating and adjustment block 35. Preload block 40 has a tapped through hole 43 into which is threaded a round nosed preload adjust screw 46. A screw 47 extends through clearance holes 36, 41 and the aligned holes in the leaf springs 31 and 34, and is secured in a tapped holes 48 in support base 17. A precision pin 49 extends through holes 42, 37, and the holes in the leaf springs 31 and 34 and is press fit into a bore 52 in support base 17.

Primary leaf spring 31 has a hole in that portion which extends beyond support base 17 and a pivot bearing 53 is secured therein. Pivot bearing 53 while extending through the primary leaf spring 31 does not contact preload leaf spring 34. Locating and adjustment block 53 does not extend beyond the edge of support base 17 and the space thereby left between primary and preload leaf springs 31 and 34 is filled with a viscoelastic material 54.

The moving system generally indicated at 55 has a pivot holder 58 of a strong light weight material which is generally cylindrical in shape and has two shoulders 59 and 60 located equidistant from each end. A pair of lightweight, opaque, "L" shaped shutter flags 61 and 64 having holes to accept the smaller diameter of the pivot holder 58 and are cemented in place against the shoulders 59 and 60 respectively. Pivots 65 are secured in each end of pivot holder 58 and are formed to mate with and rotate in pivot bearings 53 thus orienting the cylindrical axis of pivot holder 58 substantially at right angles to the axis of bore 24. Hairsprings 66 at each end of the pivot holder 58 serve to transfer electrical signals from circuitry situated on support base 17 to circuitry situated on the moving system 55.

An aluminum bobbin 67 is cemented to the ends of shutter flags 64 in such a manner so that is cylindrical axis lies substantially on the cylindrical axis of the bore 24 in support base 17. A conductive coil 70 is wound on the bobbin 67 and has its ends connected to the hairsprings 66. A lightweight metal block 71 is disposed between the shutter flags 61 and 64 adjacent to the bobbin 67 in support base channel 25 and has a centrally located tapped through hole 72 in which is disposed a balance adjust screw 73 for adjustment of accelerometer cross axis and spin sensitivity. The assembly of the metal block 71, screw 73, bobbin 67, and shutter flags 61 and 64 comprises the accelerometer inertial element or seismic mass. Shutter flags 61 and 64 extend through support base channel 25 to connect bobbin 67 in frame bore 24 with pivot holder 58 which is supported on pivots 65 between pivot bearings 53 to form the moving system 55.

Support base bore 24 has a shoulder 75 located near each end. Bore 24 also has a pair of shoulders 76 located deeper into bore 24 than shoulders 75. A pair of flux path end caps 77 are formed to fit in bore 24 on shoulders 75. End caps 77 have a centrally located shallow bore 78 to receive magnets 81 which are cemented in place in the end caps 77. Cemented to the ends of magnets 81 are pole pieces 82 which are formed to extend into the interior of bobbin 67. Shock stop screws 83 are inserted in threaded holes in support base 17 for adjustable spacing of the end of screws 83 from the edge of bobbin 67.

Figure 4:
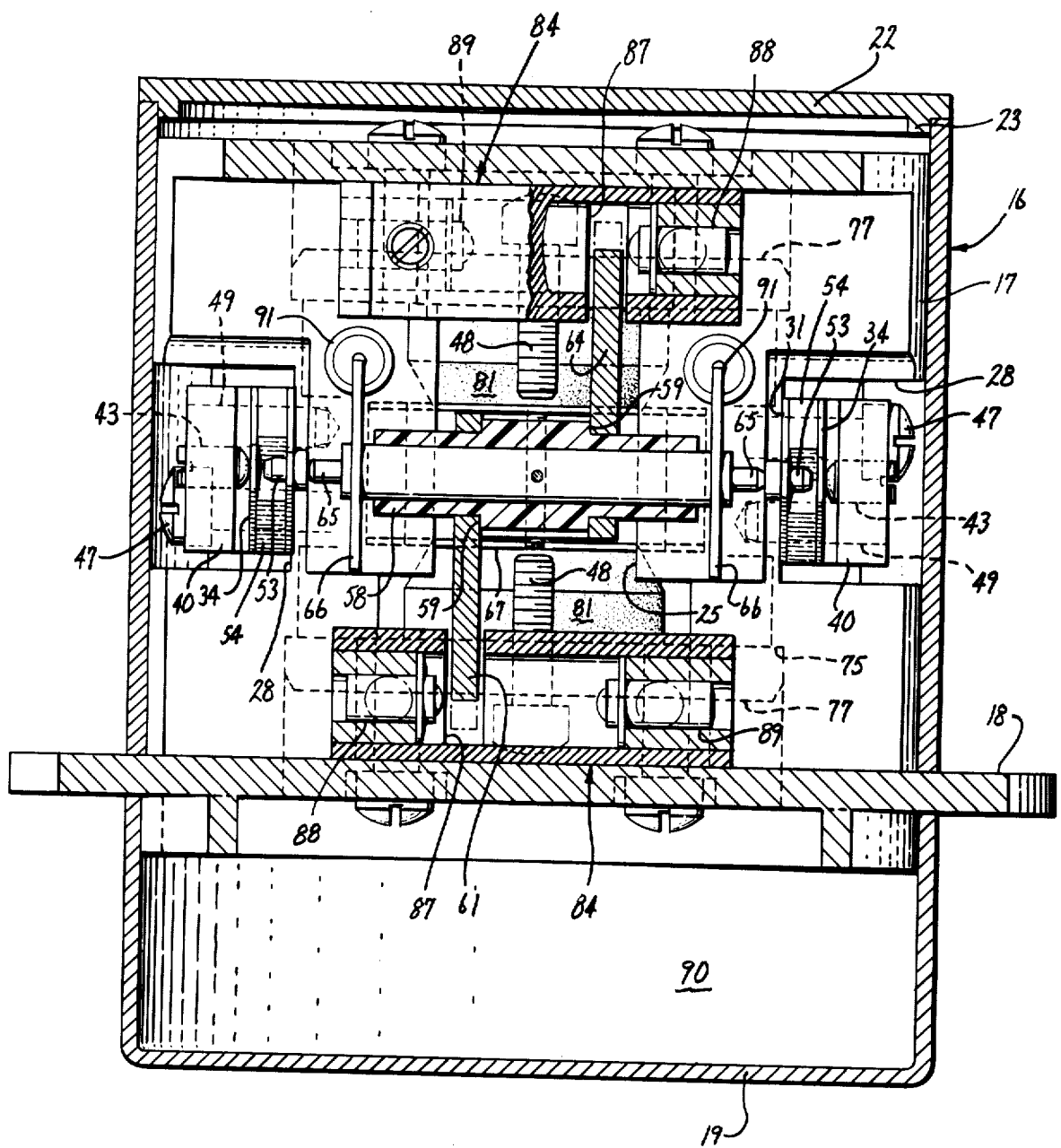
FIG. 4 is a sectional side elevation view along line 4—4 of FIG. 3.

Referring to FIG. 4 optics blocks 84 are mounted on the support base 17 on either side of the pivot axis formed by pivots 65 in pivot bearings 53. Optics block 84 have a slot 87 formed to allow shutter flags 61 and 64 to enter. Inside each optics block 84 is mounted a light emitting diode 88 adjacent to the slot 87. At the opposite end of the optics block 84, further displaced from the slot 87 and the shutter flags 61 and 64 is mounted a photo transistor 89. Shutter flags 61 and 64 are disposed in slot 87 in such a manner as to lie in the path of a beam of light emitted by light emitting diode 88 as it travels toward photo transistor 89.

Electronic circuitry of a nature required to provide for exitation of the light emitting diodes 88, amplification and conditioning of the outputs from photo transistors 89, generation of torquer signals connected to coil 70 wound on bobbin 67, and such additional circuitry as is necessary to provide desired closed loop stability and response characteristics is situated in volume 90 contained in shallow case cover 19. Standoff terminals 91 are affixed to the support base 17 for transfer of signals through the hairsprings 66 to the moving system 55.

The accelerometer described above is encompassed in an unusually small volume and due to its environmental capabilities provides accuracy of measurement in severe shock and vibration circumstances while combining the selective response characteristics inherent in a force balance type of instrument. The operation of the accelerometer may now be described. The case 16 is sealed at opposite ends by shallow cover 19 and flat cover 22. The instrument is inert gas filled eliminating the need for an expansion bellows or the like, and the associated additional volume which accompanies a liquid filled instrument. Subsequent to the assembly of the accelerometer as described above a preload force is adjusted between the pivot bearing 53 and the pivots 65 by adjusting the round nosed preload adjustment screws 46 in preload blocks 40. It is important from a preformance standpoint to have a relatively constant preload force existing at the pivot bearings 53. For this reason pivot holder 58 is fabricated of a material with a temperature coefficient of expansion similar to that of the Armco Iron used to fabricate the support base 17. A material such as a glass epoxy has such characteristics. Thus as the support base 17 grows or shrinks with temperature pivot holder 58 will grow and shrink a similar amount allowing the preload forces exerted by the spring support members 29 to remain substantially constant.

The alignment of the acceleration sensing axis within the case relative to the external mounting surface is preformed by loosening screws 47 and pivoting locating and adjustment blocks 35 about precision pins 49 until no output is provided by the instrument for omnidirectional accelerations in a plane parallel to the plane of mounting flange 18. A wedging tool is inserted between the end of adjustment block 35 and the adjacent portion of support base 17 to accomplish the aforementioned adjustment.

Cross axis acceleration sensitivity in a direction mutually perpendicular to the pivot axis and the sensitive axis is adjusted by turning the balance adjust screw 73 along the threaded hole 72 in metal block 71. This adjustment may alternately be utilized to reduce spin sensitivity to acceptable levels.

The moving system 55 supported in bearings 53 represents a mass supported by a spring. As is well known to those skilled in the art a spring mass system will experience resonance at one or more frequencies and vibration amplitudes will occur which either render the system unfit for its purpose, or prove to be potentially damaging to component parts in the system, or both. To combat this problem the spring support members 29 have sandwiched between the primary leaf spring 31 and the preload leaf spring 34 a viscoelastic material 54. This material has a damping characteristic which damps the motion of the moving system 55 on the spring support members 29. Preload forces between pivot bearings 53 and pivots 65 may be preset to withstand sinusoidal vibration inputs of 75g in the frequency spectrum 500 to 2000 Hz. The pivot bearing preload may be set to withstand higher "g" levels or to produce vibration capabilities outside of the above spectrum depending on required operational and survival characteristics.

Shock stops are provided in various parts of the instrument for limiting the motion of the moving system 55 and relieving forces on the pivots 65 at high levels of shock applied to the accelerometer. The bobbin 67 with the torquer coil 70 wound thereon is free to move in the bore 24 of support base 17 but the clearances are small. Similarly the pole pieces 82 which extend into the inside diameter of bobbin 67 clear the inside diameter of bobbin 67 by small amounts. Thus the pole pieces act as shock stops when contacted by the inside diameter of bobbin 67 for omnidirectional shock components in a plane perpendicular to the axis of bore 24. Shock stop screws 83 are adjustably set in support base 17 a predetermined distance from the edge of bobbin 67 to arrest motion of the moving system 55 relative to the support base 17 caused by bi-directional shock components in a direction parallel to the axis of bore 24. The clearances between the support base and the moving system at the shock stop contact points are large compared to those required for an air damped instrument or one with a quartz flexure support for the moving system. As a consequence mechanical parts may be less stringently controlled in the area of dimensional tolerance, and part storage and assembly spaces need not be subject to such severe cleanliness controls. The shock stop screws 83 are specifically located to contact the moving system 55 so that reaction forces transmitted through the structure of moving system 55 will pass substantially through the center of mass of the inertial element.

Slot 87 in optics block 84 has a width which does not greatly exceed the width of shutter flags 61 and 64. Thus for shock components appearing parallel to the pivot axis the sides of the slot 87 act as stops when they contact the sides of shutter flags 61 and 64. Shutter flags 61 and 64 are thus seen to act as shock stops, structural components for the moving system 55, and as light metering members for the photo transistors 89.

An optical lever effect is used to good advantage in reducing the sensitivity of the accelerometer to changes in alignment with temperature. As is most readily seen in FIG. 4 the light emitting diode 88 is much closer to the shutter flags 61 and 64 than is the photo transistor 89. Thus a small amount of motion of the flags 61 and 64 will swing the light beam emitted by the diode 88 over a greater distance at the photo transistor 89. This optical lever increased the gain of the system, which means that less gain is required elsewhere in the system tending to reduce the noise of the system. The photo transistor 89 exhibits a change in electrical properties due to temperature change. This change in the photo transistor characteristic manifests itself as an apparent shift in the sensitive area at the sensing surface of the photo transistor and is rendered less significant as an error component by the optical advantage gained through the optical lever.

Figure 5:
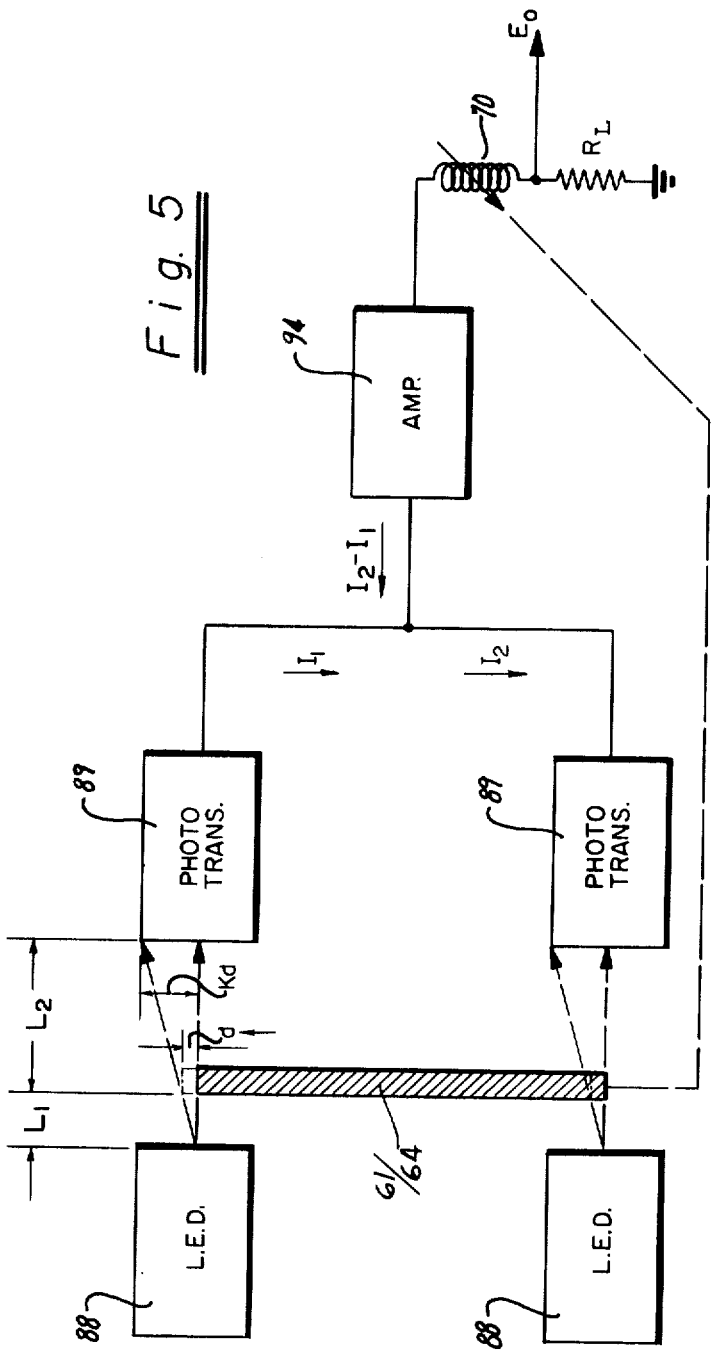
FIG. 5 is a block diagram of the accelerometer using photo transistor pickoffs.

Referring to FIG. 5 the accelerometer configuration using photo transistor pickoffs is shown. The light emitting diode 88 is displaced from shutter flags 61 and 64 by a distance $L_1$. The remaining distance to the photo transistor 89 is designated $L_2$. It can be seen that if shutter flags 61 and 64 move a small distance $d$, it follows from the law of similar triangles, that the light beam emitted by diode 88 will swing across the face of photo transistor 89 a distance $Kd$ where gain factor $K$ equals the ratio of $L_2+L_1/L_1$.

Photo transistors 89 are connected to the circuit in such a fashion that each conducts a current $I_1$ and $I_2$ depending upon the amount of light impinging upon the surface of the transtor. transistor. the example shown in FIG. 5 top photo transistor 89 is darkened and the lower photo transistor 89 has its entire sensistive surface exposed to the light emission from diode 88. $I_1$ will be small relative to the current $I_2$. Kirchoff's law demands that the current flowing in the connection to amplifier 94, which represents the electronics contained in the volume 90, be the difference between the two currents or in this case $I_2 - I_1$. Thus the photo transistors 89 provide an output proportional to the external stimulus which causes shutter flags 61 and 64 to move through a distance $d$. In this particular example the stimulus is a linear acceleration. The amplified output signal is sent to torquer coil 70 which tends to reposition shutter flags 61 and 64 in a neutral position relative to the frame mounted photo transistors 89. An output voltage is taken from the high side of a load resistor labelled $R_L$ which is connected in series with the torquer coil 70.

The invention has been described in this embodiment as including a photo sensitive pickoff. The accelerometer is equally capable of operating utilizing other types of pickoffs such as the variable Q types disclosed in U.S. Letters Pat. No. 3,074,279.

It is apparent that a new sub-miniature, highly accurate, accelerometer capable of functioning without degradation in high shock and vibration environments has been created. The embodiment disclosing the use of optical pickoffs has shown the use of an optical lever principle which provides a gain in the system.

What is claimed is:

1. In an accelerometer, a support base, a pair of spaced spring support means attached to the support base, a moving system pivotally supported by said spring support members responsive to acceleration experienced by said support base, pickoff means disposed to sense motion of said moving system relative to said support base for providing output signals related thereto, torquing means responsive to said output signal for restoring said moving system to a neutral position, each of said spaced spring support means including preload and primary leaf springs, a pivot bearing mounted on each of said primary leaf springs, and engaging said moving system and a viscoelastic material positioned between said preload and primary leaf springs, whereby resonance of the moving system on said spring support means in inhibited by the damping characteristic of said viscoelastic material.

2. An accelerometer as in claim 1 together with pivots on said moving system formed to fit and rotate in said pivot bearings, means contacting said preload leaf spring for adjusting preload force exerted by said spring support members on said pivots, means for adjusting the alignment of the acceleration sensing axis relative to an external reference plane and shock stops on the support base for limiting motion of the moving system to preclude occurrence of damaging forces exerted on said pivot bearings by said pivots, said means for adjusting preload operating to provide for predetermined moving system performance in shock and vibration environments.

3. An accelerometer as in claim 1 wherein said pickoff means comprises first and second light emitting diodes mounted in the support base spaced apart from first and second photo transistors respectively and wherein said moving system includes first and second shutter flags interposed between said first and second light emitting diodes and said first and second photo transistors respectively.

4. An accelerometer as in claim 3 wherein said shutter flags are closer to said light emitting diodes than to said photo transistors thereby creating an optical lever between said light emitting diodes and photo transistors, whereby a small arc of shutter flag pivotal motion causes a larger translation of the light beam emitted by said light emitting diodes across the face of said photo transistor, said optical lever increasing the gain of the system.

5. An accelerometer as in claim 3 wherein said first and second shutter flags operate as a support for the moving member of said torquing means, as shock stops, and as light metering members for said photo transistors.

6. An accelerometer comprising a support base having an external reference defining the sensitive axis, a seismic mass pivotally supported in said support base, pickoff means disposed between the seismic mass and the support base for providing output signals due to pivotal motion of the mass from a neutral position relative to the support base, torquing means responsive to said output signal for restoring the mass to said neutral position, and a pair of spring support members attached to said support base for pivotally supporting said seismic mass, said spring support members including first and second leaf springs, and viscoelastic material positioned between said first and second leaf springs, whereby resonance of the mass on said spring support members is prevented by the damping characteristic of said viscoelastic material.

7. An accelerometer as in claim 6 wherein said spring support members include pivot bearings in said first leaf spring and said seismic mass has pivots defining a pivot axis and formed to fit and rotate in said pivot bearings, together with means for aligning the pivot axis relative to the external reference on said support base, means contacting said second leaf spring for adjusting preload force between said pivot bearings and said pivots, and shock stops on said support base for limiting motion of said seismic mass to preclude occurrence of damaging forces between said pivot bearings and said pivots, said means for adjusting preload force operating to provide predetermined shock and vibration capability.

8. An accelerometer as in claim 6 wherein said pickoff means comprises first and second light emitting diodes mounted in said support base spaced apart from first and second photo transistors respectively, and wherein said seismic mass includes first and second shutter flags interposed between said first and second light emitting diodes and first and second photo transistors respectively for metering the quantity of light received by said first and second photo transistors from said first and second light emitting diodes respectively.

9. An accelerometer as in claim 8 wherein said shutter flags are closer to said light emitting diodes than to said photo transistors thereby creating an optical lever between said light emitting diodes and said photo transistors whereby a small arc of shutter flag rotation causes a larger translation of the light beam emitted by said light emitting diodes across the face of said photo transistor, said optical lever increasing the gain of the system and decreasing error components due to photo transistor temperature sensitivity.

10. A method for providing a high shock and vibration capability accelerometer comprising the steps of forming a moving system having a pivot axis, spacing the center of mass of the moving system from the pivot axis, mounting the moving system with the pivot axis on pivot bearings, supporting the pivot bearings in spring supports, attaching the spring supports to a support base, aligning the pivot axis so that no output occurs for acceleration inputs along the pivot axis and the axis orthogonal to both the pivot axis and the sensitive axis, attaching a material to the spring supports for dissipating kinetic energy in the moving system along the pivot axis whereby resonance of the moving system on the spring supports along the pivot axis is prevented sensing motion of the moving system about the pivot axis relative to a neutral reference on the support base, and torquing the moving system toward the neutral reference according to the sensed motion whereby the level of torque required to torque the moving system toward the neutral reference becomes a measure of framework acceleration.

11. In an accelerometer, a support base, pivot bearings carried by said support base, a moving system, pivot elements defining a pivot axis mounted on said moving system for contacting said bearings, pickoff means including first and second light emitting diodes, first and second photosensitive devices disposed to receive the light energy from said first and second light emitting diodes respectively, said pickoff means further including a moving member responsive to acceleration mounted on said moving system for sensing motion of said moving system above said pivot axis and for providing output signals related to said motion, said moving member including first and second integral shutter flags for metering the amount of light energy received by said first and second photosensitive devices respectively, said shutter flags being located closer to said light emitting diodes than to said photosensitive devices, thereby creating an optical lever therebetween, whereby moving system pivoting motion causes said shutter flag to translate through a larger portion of the light energy beam emitted by said light emitting diodes and causes greater change per increment of moving system arc motion in the amount of light energy received by said phototransistors, torquing means carried on said moving system for providing a restoring torque to said moving system responsive to said output signal, said torquing means including a torque coil integral with said moving system and having a coil axis disposed at substantially 90° to said shutter flags about said pivot axis whereby said torquing means and pickoff means lever arms as measured from the pivot axis within a given accelerometer volume is maximized.

12. An accelerometer as in claim 11 together with spaced spring support means including preload and primary leaf springs, said pivot bearings being mounted on said primary leaf spring, a viscoelastic material positioned between said preload and primary leaf springs and means for applying force to said preload leaf spring, whereby preload forces are created on said pivot axis and resonance of the moving system on said spring support means is inhibited by the damping characteristic of said viscoelastic material.

13. In an accelerometer, a support base, a pair of spaced spring support assemblies secured to the support base, a moving system having a flag, pivot and bearing assembly engaging the moving system and a spring support assembly, pickoff means for sensing the position of the flag and for providing an output signal related to pivotal motion of said moving system and the flag carried thereby, restoring means responsive to said output signal for applying a force to the moving system, each of said spaced spring support assemblies including first and second leaf springs overlying each other, means for preloading said second spring to apply a force to said first spring, and a viscoelastic material positioned between said first and second leaf springs, whereby resonance of the moving system on said spring support assemblies is prevented by the damping characteristics of said viscoelastic material.

14. In an accelerometer, a support base, a pair of spaced spring support means attached to the support base defining a pivot axis, a moving system pivotally mounted on said spring support members, pickoff means including a moving member mounted on said moving system for sensing motion of said moving system about said pivot axis and for providing output signals related to said motion, said spaced spring support means including preload and primary leaf springs, pivot bearings mounted on said primary leaf spring, and a viscoelastic material positioned between said preload and primary leaf springs, whereby resonance of the moving system on said spring support means is prevented by the damping characteristics of said viscoelastic material.

15. An accelerometer as in claim 14 wherein said pickoff means includes a first photosensitive device and a first light source mounted on said support base to direct light energy toward said photosensitive device and wherein said moving member intercepts at least a portion of said light energy.

16. An accelerometer as in claim 15 together with a second photosensitive device and a second light source mounted on said support base at a substantial angle about said pivot axis from said first photosensitive device and wherein said moving member alternately intercepts at least a portion of light energy from said first and second light sources, said first and second photosensitive devices, being connected to provide a difference output whereby the magnitude of said output signals is increased for a given motion of said moving system about said pivot axis.

17. In an accelerometer, a mounting base, a pivoting element, bearings carried by said mounting base for pivotally supporting said pivoting element and defining a pivot axis for said pivoting element, means for generating a permanent magnetic flux field mounted in said mounting base, a torque coil carried by said pivoting element disposed in said magnetic flux field for providing a restoring torque to said pivoting element, said pivot axis lying in the plane of symmetry of said torque coil, pickoff means mounted on said mounting base including light source and a solid state photo sensing device positioned to receive light energy from said light source, a moving member responsive to acceleration carried by said pivoting element and positioned adjacent to said light source and spaced from said photo sensing device, said moving member position providing for an optical lever advantage providing system gain and reducing system noise, whereby said moving member meters said light energy received by said photo sensitive device producing an output signal therefrom indicative of acceleration.

* * * * *